United States Patent [19]
Ide

[11] Patent Number: 5,296,849
[45] Date of Patent: Mar. 22, 1994

[54] PAGER RECEIVER FOR ENABLING TO OMIT POWER-ON SIGNAL FOR RECEIVING SYNCHRONIZATION CODE IN PAGER SIGNAL

[75] Inventor: Motoki Ide, Tokyo, Japan

[73] Assignee: NEC Corporation, Tokyo, Japan

[21] Appl. No.: 782,829

[22] Filed: Oct. 25, 1991

[30] Foreign Application Priority Data

Oct. 25, 1990 [JP] Japan .................................. 2-285753

[51] Int. Cl.⁵ .............................................. H04Q 1/00
[52] U.S. Cl. ............................... 340/825.44; 455/38.3; 455/343
[58] Field of Search ........................ 340/825.44, 825.47, 340/825.48; 455/228, 334, 343, 38.1, 38.3

[56] References Cited

U.S. PATENT DOCUMENTS

| | | | |
|---|---|---|---|
| 4,903,335 | 2/1990 | Shimizu | 340/825.44 |
| 4,996,526 | 2/1991 | DeLuca | 340/825.44 |
| 5,049,875 | 9/1991 | DeLuca et al. | 340/825.44 |

FOREIGN PATENT DOCUMENTS

2144565 3/1985 United Kingdom.

*Primary Examiner*—Donald J. Yusko
*Assistant Examiner*—Brian Zimmerman
*Attorney, Agent, or Firm*—Sughrue, Mion, Zinn, Macpeak & Seas

[57] ABSTRACT

A pager receiver is assigned to a particular call number and is for receiving pager signals of a predetermined baud rate by use of the battery saving technique. Each of the pager signal comprises a synchronization code signal and a plurality of address signals, each of the address signals comprising a call number and a message, a particular one of the address signals being assigned to the pager receiver. The pager receiver is driven by a power-on signal at a timing for receiving the particular address signal. The pager receiver has a baud rate monitoring circuit for detecting the predetermined baud rate of a signal received to produce a monitoring signal, and a comparing circuit for comparing the call number in the particular address signal with the particular call number to produce a coincident signal. When both of the monitoring signal and the coincident signal are present at a time, the pager receiver drives an indicator.

4 Claims, 9 Drawing Sheets

PAGER RECEIVER FOR ENABLING TO OMIT POWER-ON SIGNAL FOR RECEIVING SYNCHRONIZATION CODE IN PAGER SIGNAL

BACKGROUND OF THE INVENTION

The present invention relates to a pager receiver for receiving pager signals having a predetermined baud rate.

The pager receiver intermittently receives the pager signals. Each of the pager signals comprises a preamble signal and one or more batch signals succeeding the preamble signal. Each of the batch signals comprises a synchronization code signal and a plurality of address signals or groups succeeding the synchronization code signal. A particular one of the address signals is assigned to the pager receiver. Each of the address signals comprises a call number signal and a message.

The pager receiver usually uses a battery for an electric power source and includes a receiving circuit for receiving the pager signal. The receiving circuit is supplied with the electric power from the battery.

A battery saving technique is known in the art for strictly restricting the power supply to the receiving circuit from the battery. The receiving circuit has a battery saving switch and is connected to the battery through the battery saving switch. A battery saving signal comprises power-off signals and power-on signals. The battery saving switch is repeatedly turned on at a predetermined time period shorter than the preamble duration. When the preamble signal is detected or when the predetermined baud rate is detected, the power-on signal is kept until the synchronization code signal is detected at first. Then, the battery saving signal becomes power-off signal. Thereafter, the power-on signal is repeatedly produced at timings for receiving the synchronization code signal and the particular address signal in each of the batches.

In order to enhance the power saving, it is desired for the receiving circuit to receive only particular address signals after receiving the first synchronization code signal. However, if the power-on signal for receiving the synchronization code signal is not produced thereafter, stop of the pager signal cannot be detected. Accordingly, the power-on signals are repeatedly produced for receiving the particular address signal even after stop of the pager signal. This makes a problem that the pager receiver erroneously operates by presence of noise or other signals during absence of the pager signals.

SUMMARY OF THE INVENTION

It is an object of the present invention to provide a pager receiver which enables to omit the power-on signal for receiving the synchronization code signal after detecting the synchronization code signal at first without the erroneous operation of the pager receiver due to noise or other signals during absence of the pager signals.

According to the present invention, a pager receiver is obtained for receiving a pager signal having a predetermined baud rate, the pager signal comprising an address signal, the address signal comprising a call number signal representative of a call number and a message signal repressensative of a message. The pager receiver comprises: receiving means for receiving the pager signal to produce a received signal; baud rate monitoring means coupled to the receiving means for monitoring a baud rate of the received signal to produce a monitored signal when the baud rate is equal to the predetermined baud rate; deriving means coupled to the receiving means for deriving the message signal from the received signal as a derived message signal; memorizing means for memorizing a particular call number assigned to the pager receiver; call number comparing means coupled to the receiving means and the memorizing means for comparing the call number represented by the call number in the received signal and the particular call number to produce a coincident signal when the call number and the particular call number are coincident with each other; deciding means coupled with the baud rate monitoring means and the call number comparing means for deciding whether or not both of the monitored signal and the coincident signal are present to produce an acceptance signal when the both of the monitored signal and the coincident signal are present; and processing means coupled to the deciding means and the deriving means responsive to the acceptance signal for taking the derived message signal thereinto.

The deciding means may be an AND circuit having two input ports coupled to the baud rate monitoring means and the call number comparing means, respectively, and an output port producing the acceptance signal.

In a pager receiver for receiving a pager signal having a predetermined baud rate, the pager signal comprising a preamble signal and one or more batch signals succeeding the preamble signal, each of the batch signals comprising a synchronization code signal and a plurality of address signals succeeding the synchronization code signal, each of the address signals comprising a call number signal and a message signal, a particular one of the address signals being assigned to the pager receiver, the pager receiver according to the present invention comprises: receiving means for receiving the pager signal to produce a received signal at power-on signals of a battery saving signal, baud rate monitoring means coupled to the receiving means for monitoring a baud rate of the received signal to produce a monitored signal when the baud rate is equal to the predetermined baud rate; preamble detection means coupled to the receiving means for detecting the preamble signal in the received signal to produce a preamble detection signal; synchronization code detection means coupled to the receiving means for detecting the synchronization code signal in each of the batch signals of the received signal to produce a synchronization detection signal; generating means coupled to the baud rate monitoring means, the preamble detection means and the synchronization code detection means for generating one of power-on signals during a time period from reception of one of the monitoring signal and the preamble detection signal to first reception of the synchronization detection signal; reference clock means for generating a reference clock signal; particular address timing decision circuit coupled to the synchronization code detection means and reference clock means for deciding a timing for receiving the particular address signal on the base of the synchronization detection signal and the reference clock signal to produce a particular address timing signal, the particular address timing signal being supplied to the receiving means as one of the power-on signals of the battery saving signal; deriving means coupled to the receiving means for deriving the message signal from the received signal as a derived message signal; memorizing means for memorizing a particular call number assigned to the pager receiver; call number comparing means coupled to the particular address timing decision circuit, the receiving means, and the memorizing means for comparing the call number represented by the call number in the particular address signal in the received signal and the particular call number to produce a coincident signal when the call number in the particular address signal and the particular call number are coincident with each other; deciding means coupled with the baud rate monitoring means and the call number comparing means for deciding whether or not both of the monitored signal and the coincident signal are present to produce an acceptance signal when the both of the monitored signal and the coincident signal are present; and processing means coupled to the deciding means and the deriving means responsive to the acceptance signal for taking the derived message signal thereinto.

DESCRIPTION OF PREFERRED EMBODIMENTS

Prior to description of preferred embodiments of the present invention, a known pager receiver will be described with reference to FIGS. 1 to 7.

Figure 1:
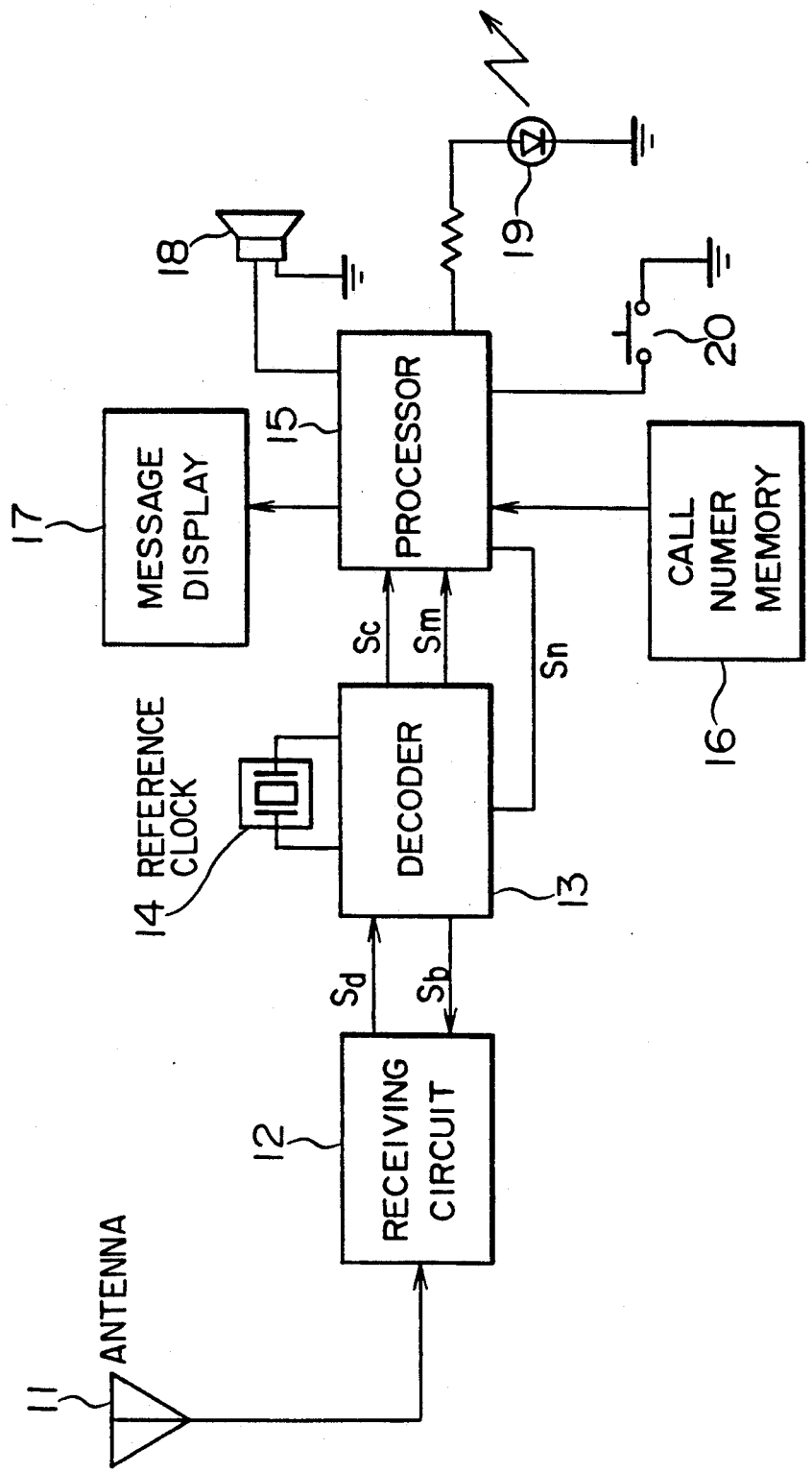
FIG. 1 is a block diagram of a known pager receiver.

Referring to FIG. 1, the known pager receiver comprises an antenna 11 and a receiving circuit 12 for receiving pager signals to produce a received data signal Sd. A decoder 13 is coupled with the receiving circuit 12 and is associated with a reference clock 14. A processor 15 is coupled with the decoder 13 and is associated with a call number memory 16, a message display 17 such as a liquid crystal display, a speaker or an annunciator 18, a light indicator 19 such as a light emitting diode, and a switch 20.

The call number memory 16 memorizes a particular call number assigned to the pager receiver. The processor 15 reads the particular call number from the pager call number memory 16 and supplies the particular call number Sn to the decoder 13.

The decoder 13 derives a message signal and a call number signal in the received signal and produces a coincident signal Sc when the call number signal is coincident with the particular call number.

When the processor 15 receives the coincident signal Sc, the processor 15 drives the speaker 18 and the light indicator 19, and also takes the message signal Sm from the decoder 13 thereinto. The processor 15 then makes the message display 17 to indicate the message signal. The processor 15 is usually provided with a random access memory (not shown) for holding the message signal Sm. When the switch 20 is turned on, the processor 15 again drives the message display 17 to indicate the message signal.

Figure 2:
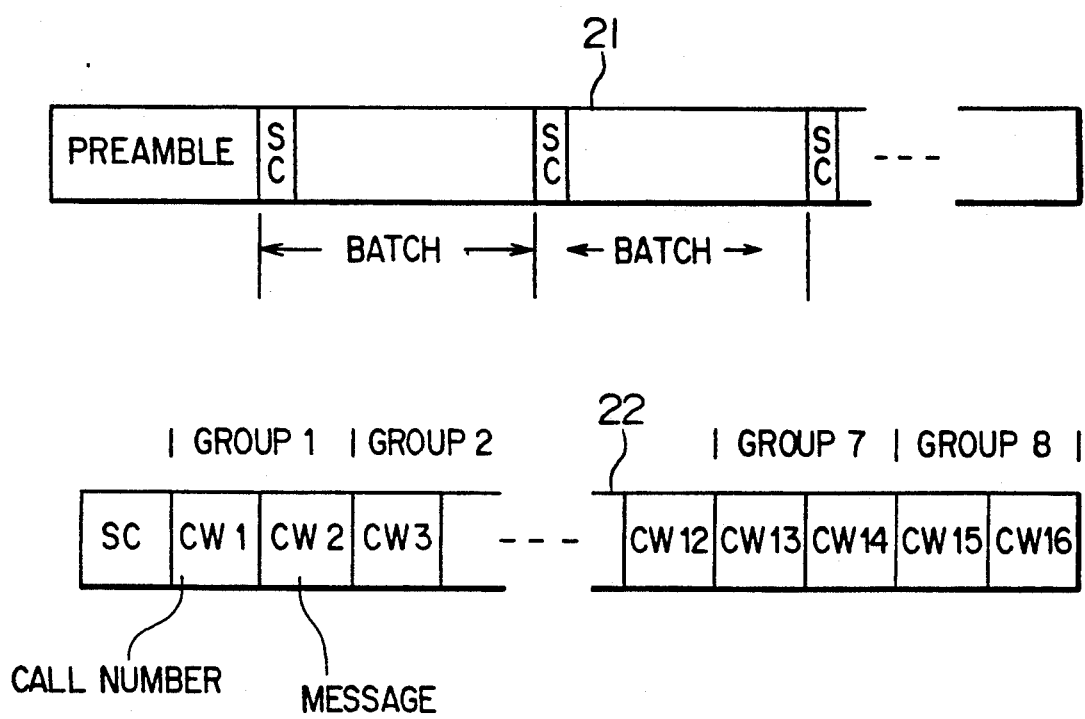
FIG. 2 is a view illustrating a POCSAG code signal as a typical pager signal.

Referring to FIG. 2, description will be made as to a POCSAG (Post office Code Standardization Advisory Group) code signal as a typical pager signal which is set up in CCIR recommendation 584.

The pager signal 21 shown in the figure carries a preamble signal and one or more batches succeeding the preamble signal. The preamble signal has, for example, an eighteen codeword length. A unit codeword consists of, for example, 32 bits. The preamble signal is specified by a repetition of pulses which are of logic "1" and "0" levels. Each of the batches is shown at 22 in FIG. 2 and consists of, for example, seventeen frames in which codewords SC and CW1 to CW16 are carried. Each of the sixteen codewords also consists of 32 bits. The codeword SC is a synchronization code signal and succeeds the preamble signal. The next succeeding sixteen codewords CW1 through CW16 are classified into eight groups or eight address signals each consisting of a pair of two successive codewords, such as codewords CW1 and CW2 form a group 1, codewords CW3 and CW4 forming another group 2, and codewords CW15 and CW16 forming a group 8. A preceding one of the pair of two codewords in one group carries a call number signal and the other carries a message. A particular one of the groups in each of the batches is assigned to the pager receiver. The pager signal has a predetermined baud rate and is repeatedly transmitted from a base station at predetermined time intervals.

Figure 3:
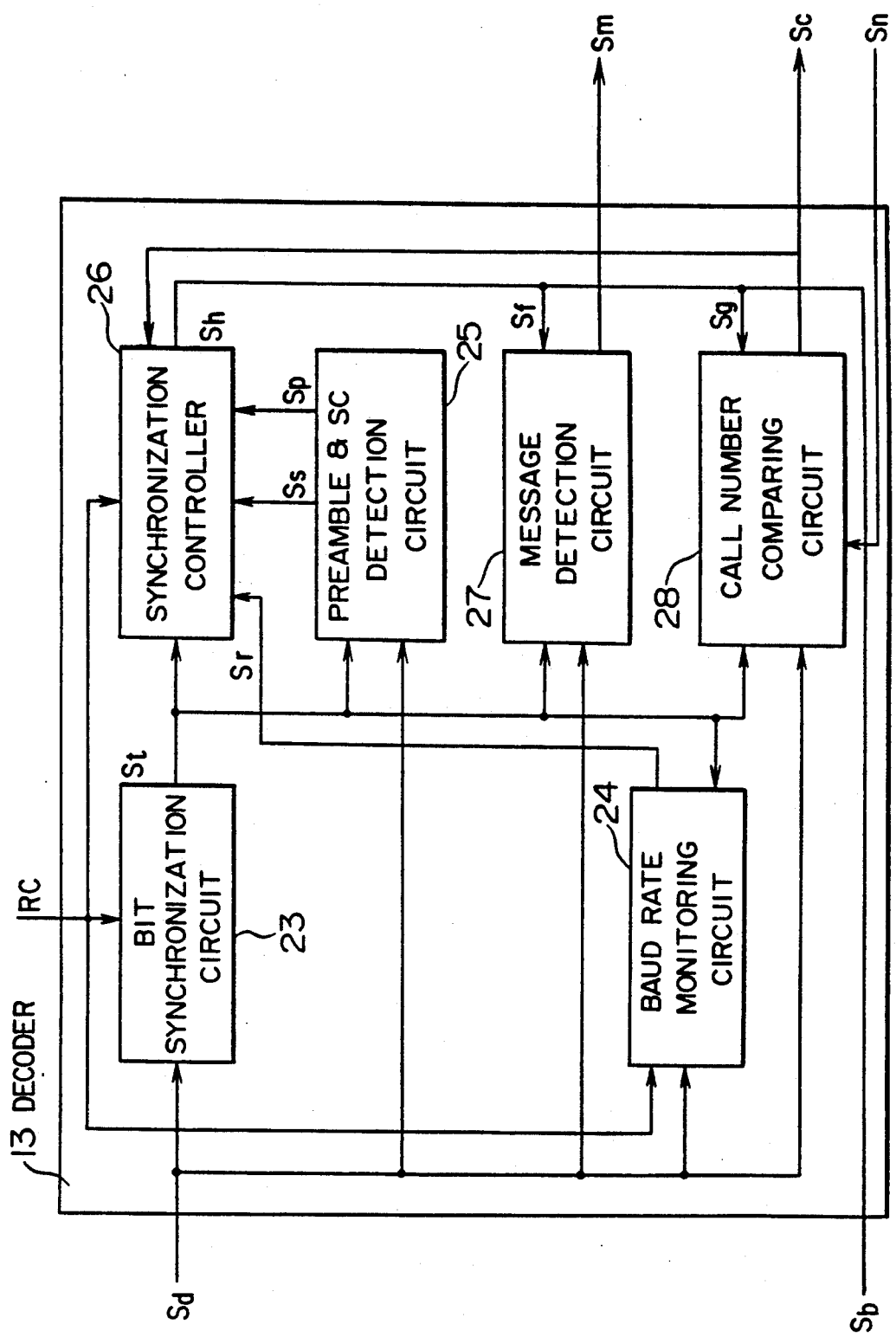
FIG. 3 is a block diagram of a decoder in the known pager receiver of FIG. 1.

Turning to FIG. 3, the decoder comprises a bit synchronization circuit 23, a baud rate monitoring circuit 24, a preamble and synchronization code detection circuit 25, a synchronization controller 26, a call number comparing circuit 28 and a message detection circuit 27. The bit synchronization circuit 23 receives the received signal Sd and the reference clock signal RC and produce a reproduced timing signal St. The baud rate monitoring circuits 24 receives the received signal Sd, the reference clock signal RC and the reproduced timing signal St and monitors the baud rate of the received signal. When the baud rate monitoring circuit 24 detects that the baud rate of the received signal is equal to the predetermined baud rate, the baud rate monitoring circuit 24 produces a monitoring signal Sr.

Figure 4:
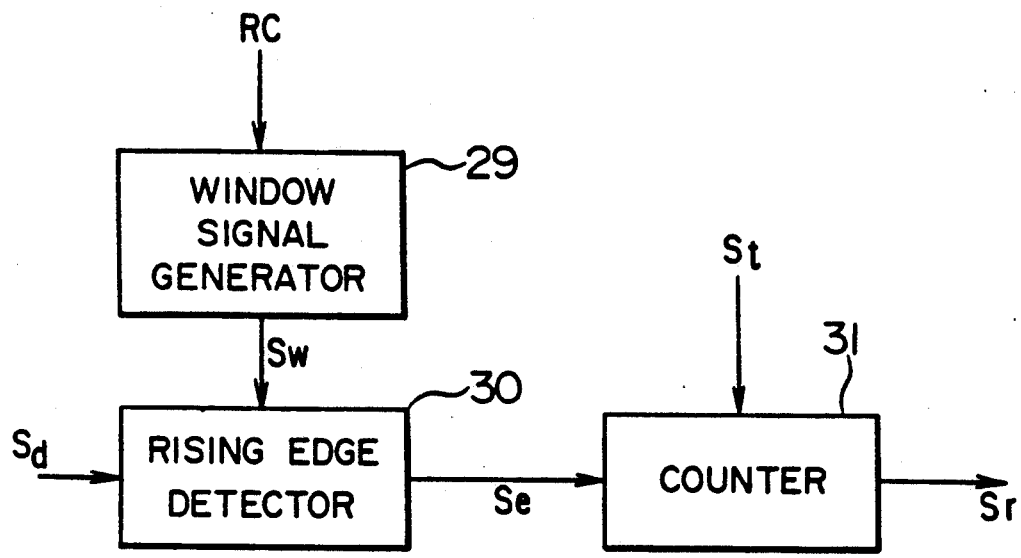
FIG. 4 is a block diagram of a baud rate monitoring circuit in the decoder of FIG. 3.

Turning to FIG. 4, the baud rate monitoring circuit 24 comprises a window signal generator 29, a rising edge detector 30, and a counter 31.

Figure 5:
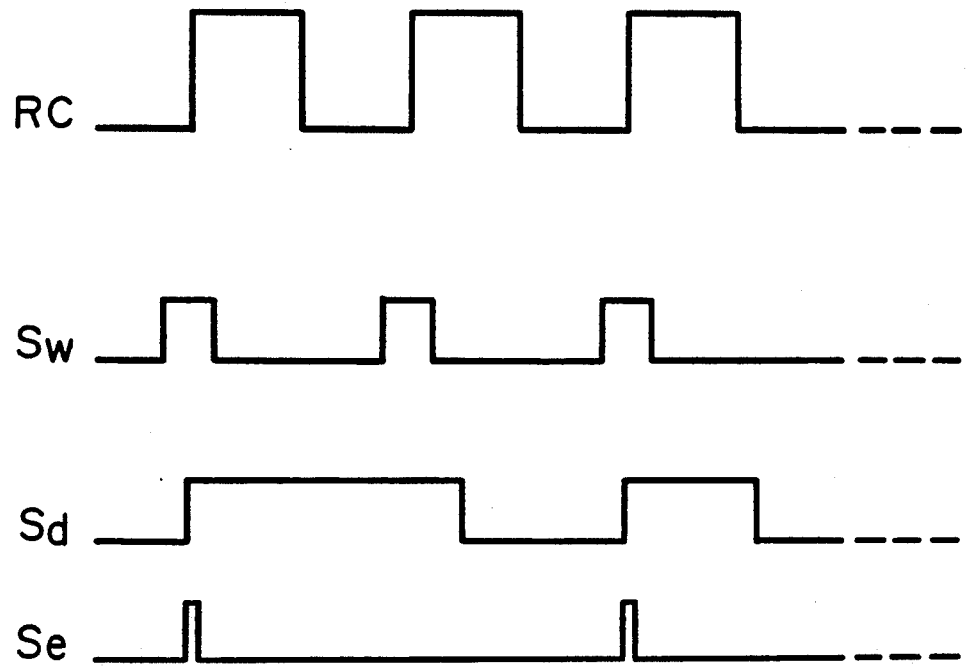
FIG. 5 is a time chart of various signals in the baud rate monitoring circuit.

Referring to FIG. 5 in addition to FIG. 4, the window signal generator 29 receives the reference clock signal RC and produces a window signal Sw which is synchronized with a rising edge of each pulse of the reference clock signal RC as shown in FIG. 5. Each pulse of the window signal Sw has a predetermined pulse width smaller than the pulse width of the reference clock signal RC. The rising edge detector 30 receives the received signal Sd and the window Sw. When detecting that a rising edge of the received signal Sd is timely coincident with one pulse of the window signal Sw, the rising edge detector 30 produces an edge detecting pulse Se as shown in FIG. 5. The counter 31 counts the edge detection pulse. When a predetermined value is counted by the counter 31 for a time length equal to one code length, the counter 31 produces a count up signal as the monitoring signal Sr.

Returning to FIG. 3, the preamble and synchronization code detection circuit 25 receives the received signal Sd and the reproduced timing signal St. When the preamble and synchronization code detection circuit 25 detects the preamble signal and the synchronization code signal in the received signal Sd, it produces the preamble detection signal Sp and the synchronization detection signal Ss, respectively. The synchronization controller 26 receives the reference clock signal RC, the reproduced timing signal St, the monitoring signal Sr, the preamble detection signal Sp, the synchronization detection signal Ss and the coincident signal Sc and produces a frame timing signal Sf, a group timing signal Sg and a battery saving signal Sb which are correctively shown by a signal Sh in FIG. 3.

Figure 6:
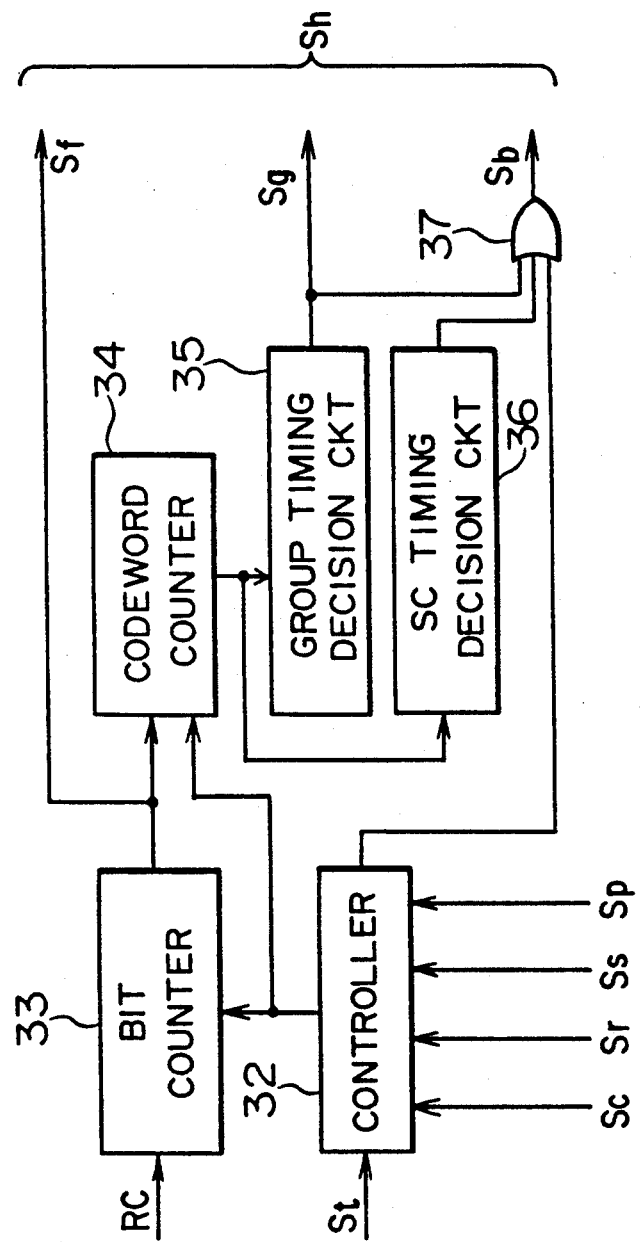
FIG. 6 is a block diagram of a synchronization controller in the decoder of FIG. 3.

Turning to FIG. 6, the synchronization controller 26 comprises a controller 32, a bit counter 33, a codeword counter 34, a group timing decision circuit 35, a synchronization code timing decision circuit 36 and an OR circuit 37. After receiving one of the monitoring signal Sr and the preamble detection signal Sp, the controller 32 produces a start signal to the bit counter 33 and the codeword counter 34 when receives the synchronization detection signal Ss. In response to the start signal, the bit counter 33 starts to count the reference clock signal RC. Upon counting up to thirty-two, the bit counter 33 resets to produce a codeword pulse representative of one codeword. Then, the bit counter 33 again counts the reference clock signal RC. The codeword pulse is delivered to the message detection circuit 27 as the frame timing signal Sf. The codeword counter 34 starts to count the codeword pulse. Upon counting up to seventeen pulses, the codeword counter 34 resets and again counts the codeword pulse from the bit counter 33. A counted number in the code word counter 34 is supplied to the group timing decision circuit 35. The group timing decision circuit 35 decides a group timing of the particular group assigned to the pager receiver from the counted number in the codeword counter 34 to produce the group timing signal Sg.

Returning to FIG. 3, the message detection circuit 27 receives the received signal Sd, the reproduced timing signal St, and the frame timing signal Sf and derives a codeword in each of frames of the received signal. The call number comparing circuit 28 receives the received signal Sd, the reproduced timing signal St, the group timing signal Sg and the particular call number Sn, and compares the call number signal in the particular group in the received signal with the particular call number Sn. Upon detecting that the both of them are coincident with each other, the call number comparing circuit 28 produces the coincident signal Sc.

As described above in connection with FIG. 1, the processor 15 reads the content in the message detection circuit 27 in response to the coincident signal Sc. At that time, the message detection circuit 27 detects the codeword carrying the message in the particular group. Accordingly, the processor 15 can take out the message addressed to the pager receiver.

The above-described operation is repeatedly performed for each of the batches in the pager signal.

As described in the preamble, the pager receiver uses a battery as an electric power source and the power saving technique in order to strictly restrict consumption of electric power of the battery.

Referring to FIGS. 1 and 6, the controller 32 repeatedly produces a power-on signal at time intervals to the receiving circuit 12. The receiving circuit 12 is only supplied with the power from the battery during a time duration of the power-on signal when the pager signal is not transmitted from the base station. The time duration of the power-on signal is called a power-on duration.

When the receiving circuit 12 receives the pager signal during the power-on duration and when the controller 32 receives one of the monitoring signal Sr and the preamble detection signal Sp, the controller 32 continues the power-on signal to extend the power-on duration. Thereafter, when the controller 32 receives the synchronization detection signal Ss, the controller 32 stops the power-on signal. Thereafter, the group timing signal Sg is delivered as another power-on signal to the receiving circuit 12 from the group timing decision circuit 35 through the OR circuit 37. When receiving the coincident signal Sc, the controller 32 again produces the power-on signal. Thus, the receiving circuit 12 can receives the particular group of the pager signal.

Further, the synchronization code timing decision circuit 36 (FIG. 6) receives the content of the codeword counter 34 and decides a timing of the synchronization codeword from the content to produce a synchronization timing signal. The synchronization timing signal is supplied as a further power-on signal to the receiving circuit 12. Therefore, the receiving circuit 12 can receive the synchronization codeword SC in each of the batches in the pager signal.

Figure 7:
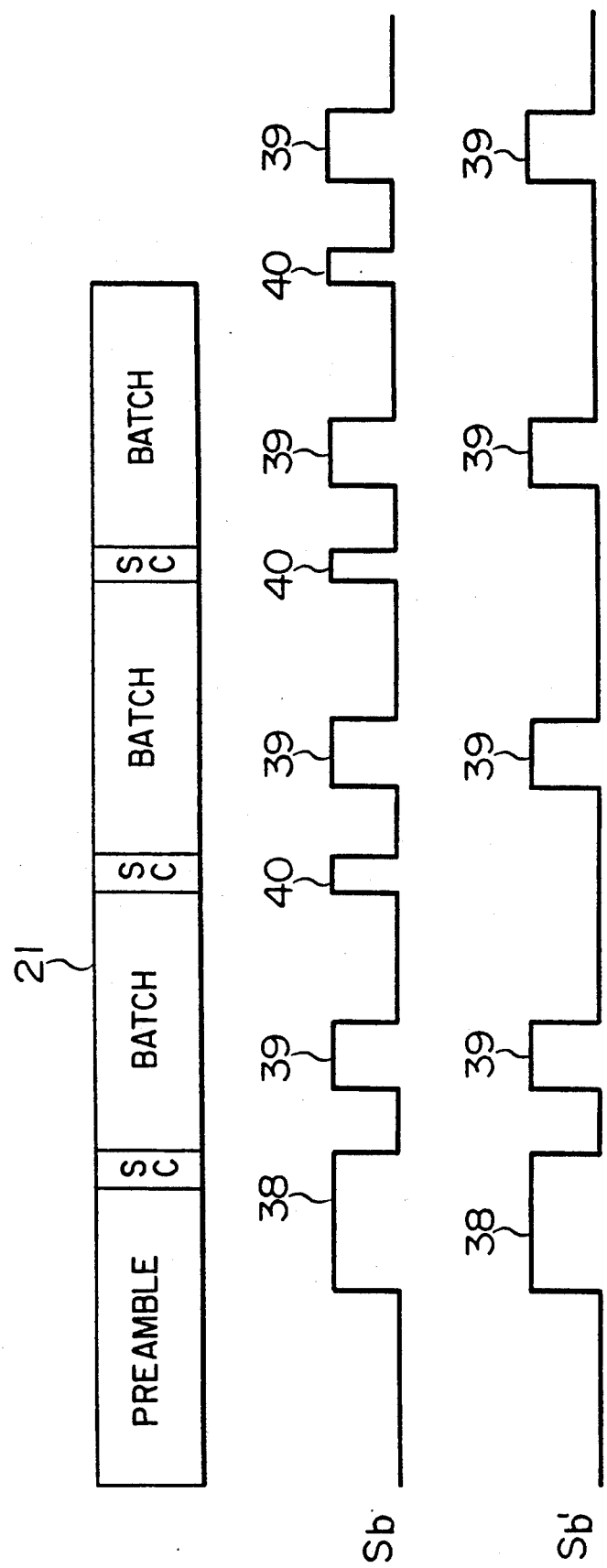
FIG. 7 is a time chart illustrating the POCSAG signal and different battery saving signals.

Referring to FIG. 7, a time chart of the battery saving signal is shown at Sb in relation to the pager signal 21. In the battery saving signal Sb, power-on signals 38, 39, and 40 are for receiving the first synchronization codeword SC after detection of the preamble, for receiving the particular group, and for receiving the synchronization codeword SC in each of the batches in the pager signal 21.

Returning to FIG. 6, when the controller 32 receives no synchronization detection signal Ss for a predetermined time length, the controller 32 stops the operation of the bit counter 33 and the codeword counter 34.

In the power saving operation, the power-on signal 40 is repeatedly produced for receiving the synchronization codeword in each of the batches of the pager signal in order to detect stop of the pager signal. However, it is desired for the battery saving to omit the power-on signals 40 for receiving synchronization codewords SC, as shown at Sb' in FIG. 7.

When the power-on signals 40 are omitted, stop of the pager signals cannot be detected. Therefore, the power-on signal for receiving the particular group is repeatedly generated after stop of the pager signal. As a result, the receiving circuit 12 receives a noise or any other signals. When the noise or the other signals are coincident with the particular call number Sn, the call number comparing circuit 28 erroneously produces the coincident signal Sc. As a result, the speaker 18 and the light indicator 19 are erroneously driven.

Figure 8:
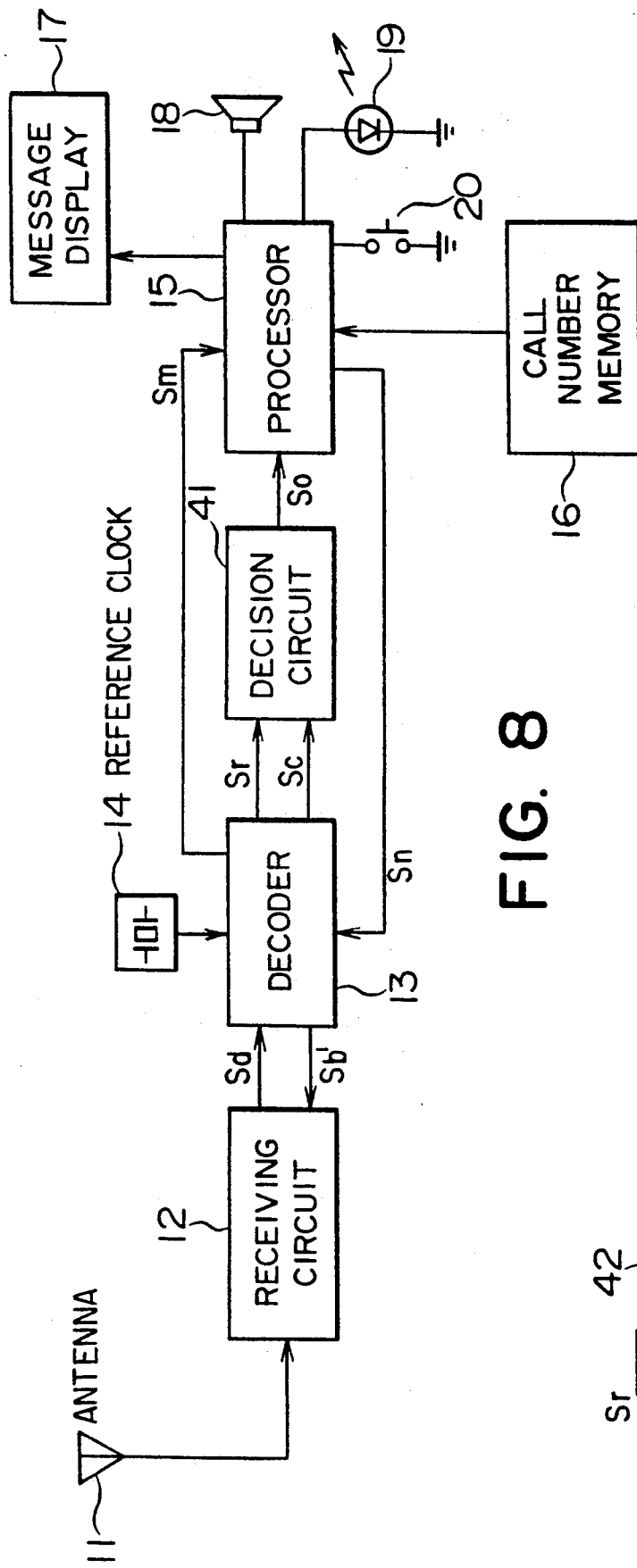
FIG. 8 is a block diagram view of a pager receiver according to an embodiment of the present invention.

Referring to FIG. 8, the pager receiver according to an embodiment of the present invention comprises similar parts to the known pager receiver in FIG. 1 except a decision circuit 41. Similar portions are represented by the same reference symbols in FIG. 1.

The decision circuit 41 is coupled to the decoder 13, in detail to the band rate monitoring circuit 24 and the call number comparing circuit 28 as shown in FIG. 3. When decision circuit 41 receives the monitoring signal Sr and the coincident signal Sc at a time, the decision circuit 41 produces an acceptance signal So. When the processor 15 receives the acceptance signal So, the processor 15 drives the speaker 18 and the light indicator 19 and takes the message thereinto from the message detection circuit 27 (FIG. 3).

Figure 9:
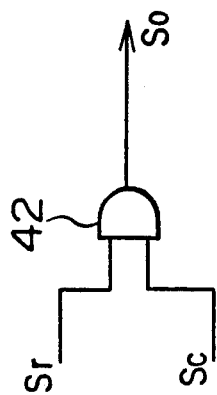
FIG. 9 is an example of a decision circuit in the pager receiver of FIG. 8.

Referring to FIG. 9, an example of the decision circuit 41 is an AND gate 42. The AND gate 42 has two input terminals for receiving the monitoring signal Sr and the coincident signal Sc, respectively, and an output terminal for producing the acceptance signal So.

The decision circuit 41 is alternatingly composed of a signal processing unit having a decision program for deciding that both of the monitoring signal Sr and the coincident signal Sc are present at a time.

Figure 10:
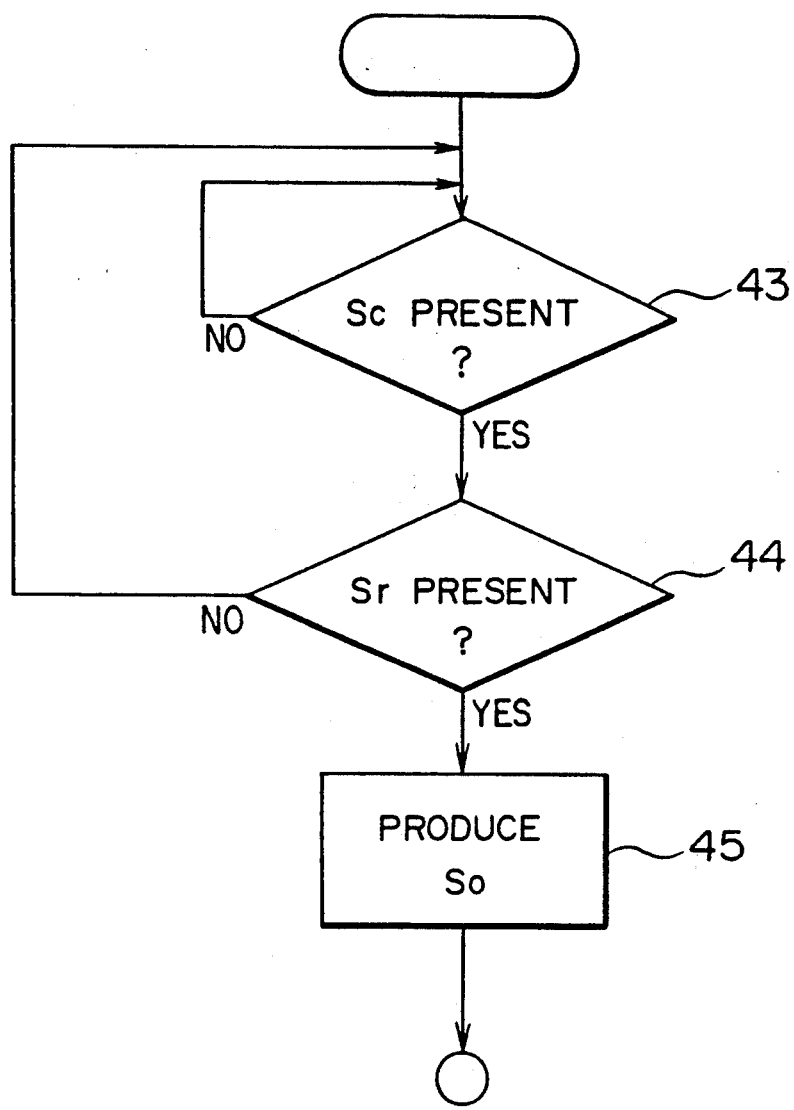
FIG. 10 is a flow chart illustrating the deciding operation of the decision circuit according to another example.

Referring to FIG. 10, the flow chart shown therein illustrates steps of the decision program. At step 43, it is detected whether or not the coincident signal Sc is present. When the coincident signal Sc is detected, the step proceeds to step 44. At step 44, it is detected whether or not the monitoring signal Sr is present. When the monitoring signal Sr is present, the acceptance signal So is produced at next step 45.

It is possible to realize the decision circuit 41 and the processor 15 by a single processor unit, for example, a one-chip microprocessor.

In the pager receiver of FIG. 8, the processor 15 starts its operation in response to the acceptance signal from the decision circuit 41. Accordingly, even if the coincident signal So is erroneously produced from the decoder 13 due to noise after the pager signal stops, the processor 15 is prevented from the erroneous operation because the monitoring signal Sr is not present. Accordingly, the battery saving signal Sb' in FIG. 7 can be employed.

Figure 11:
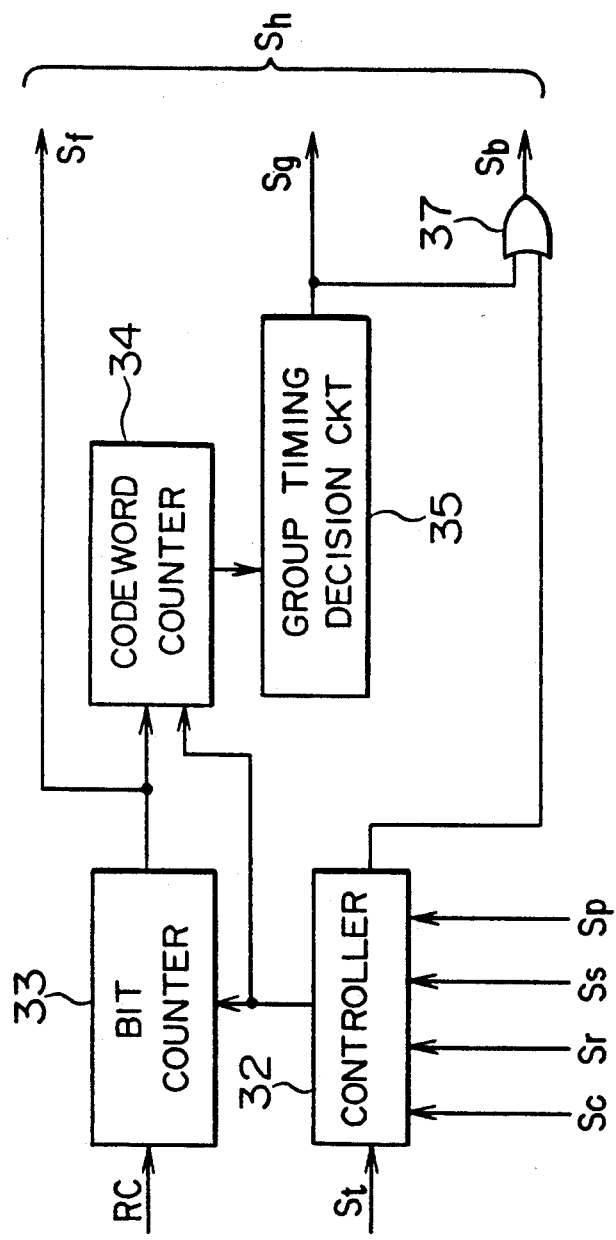
FIG. 11 is a block diagram view of a synchronization controller for generating the battery saving signal of Sb' in FIG. 7.

Referring to FIG. 11, an example of the synchronization controller 26 for producing the battery saving signal Sb' is similar to the synchronization controller of FIG. 6. The similar portions are represented by the same reference symbols.

The synchronization controller of FIG. 11 does not have the synchronization codeword timing decision circuit (36 in FIG. 6) and therefore produces no power-on signal 40 for receiving the synchronization codeword Sc.

The controller 32 decides stop of the pager signal when receiving no monitoring signal Sr for a predetermined time length and stops operation of the bit counter 33 and the codeword counter 34.

What is claimed is:

1. A pager receiver for receiving a pager signal having a predetermined baud rate, said pager signal comprising a preamble signal and one or more batch signals succeeding the preamble signal, each of the batch signals comprising a synchronization code signal and a plurality of address signals succeeding the synchronization code signal, each of said address signals comprising a call number signal representative of a call number and a message signal representative of a message, a particular one of the address signals being assigned to the pager receiver, said pager receiver comprising:

receiving means for receiving said pager signal to produce a received signal at power-on signals of a battery saving signal;

baud rate monitoring means coupled to said receiving means for monitoring a baud rate of said received signal to produce a monitored signal when said baud rate is equal to said predetermined baud rate;

preamble detection means coupled to said receiving means for detecting said preamble signal in said received signal to produce a preamble detection signal;

synchronization code detection means coupled to said receiving means for detecting said synchronization code signal in each of said batch signals of the received signal to produce a synchronization detection signal;

battery saving signal generating means coupled to said baud rate monitoring means, said preamble detection means and said synchronization code detection means for generating one of said power-on signals of said battery saving signal during a time period from reception of one of said monitoring signal and said preamble detection signal to first reception of said synchronization signal and, thereafter, producing another of said power-on signals at a timing for receiving said particular address signal;

deriving means coupled to said receiving means for deriving said message signal from said received signal as a derived message signal;

memorizing means for memorizing a particular call number assigned to said pager receiver;

call number comparing means coupled to said receiving means and said memorizing means for comparing said call number represented by said call number signal in said received signal and said particular call number to produce a coincident signal when said call number and said particular call number are coincident with each other;

deciding means coupled with said baud rate monitoring means and said call number comparing means for deciding whether or not both of said monitored signal and said coincident signal are present to produce an acceptance signal when said both of said monitored signal and said coincident signal are present; and processing means coupled to said deciding means and said deriving means responsive to said acceptance signal for taking said derived message signal thereinto.

2. A paper receiver as claimed in claim 1, wherein said deciding means is an AND circuit having two input ports coupled to said baud rate monitoring means and said call number comparing means, respectively, and an output port producing said acceptance signal.

3. A pager receiver for receiving a pager signal having a predetermined baud rate, said pager signal comprising a preamble signal and one or more batch signals succeeding the preamble signal, each of the batch signals comprising a synchronization code signal and a plurality of address signals succeeding the synchronization code signal, each of the address signals comprising a call number signal and a message signal, a particular one of the address signals being assigned to the pager receiver, said pager receiver comprising:

receiving means for receiving said pager signal to produce a received signal at power-on signals of a battery saving signal;

baud rate monitoring means coupled to said receiving means for monitoring a baud rate of said received signal to produce a monitored signal when said baud rate is equal to said predetermined baud rate;

preamble detection means coupled to the receiving means for detecting said preamble signal in said received signal to produce a preamble detection signal;

synchronization code detection means coupled to said receiving means for detecting said synchronization code signal in each of said batch signals of the received signal to produce a synchronization detection signal;

generating means coupled to said baud rate monitoring means, said preamble detection means and said synchronization code detection means for generating one of power-on signals during a time period from reception of one of said monitoring signal and said preamble detection signal to first reception of said synchronization detection signal;

reference clock means for generating a reference clock signal;

particular address timing decision circuit coupled to said synchronization code detection means and reference clock means for deciding a timing for receiving said particular address signal on the basis of the synchronization detection signal and said reference clock signal to produce a particular address timing signal, said particular address timing signal being supplied to said receiving means as one of the power-on signal of said battery saving signal;

deriving means coupled to said receiving means for deriving said message signal from said received signal as a derived message signal;

memorizing means for memorizing a particular call number assigned to said pager receiver;

call number comparing means coupled to said particular address timing decision circuit, said receiving means, and said memorizing means for comparing said call number represented by said call number in said particular address signal in said received signal and said particular call number to produce a coincident signal when said call number in said particular address signal and said particular call number are coincident with each other;

deciding means coupled with said baud rate monitoring means and said call number comparing means for deciding whether or not both of said monitored signal and said coincident signal are present to produce an acceptance signal when said both of said monitored signal and said coincident signal are present; and processing means coupled to said deciding means and said deriving means responsive to said acceptance signal for taking said derived message signal thereinto.

4. A pager receiver as claimed in claim 3, wherein said deciding means is an AND circuit having two input ports coupled to said baud rate monitoring means and said call number comparing means, respectively, and an output port producing said acceptance signal.

* * * * *